(12) United States Patent
Lin et al.

(10) Patent No.: US 9,135,192 B2
(45) Date of Patent: Sep. 15, 2015

(54) MEMORY SYSTEM WITH COMMAND QUEUE REORDERING

(75) Inventors: Gary Lin, San Jose, CA (US); Matthew Davidson, Mountain View, CA (US)

(73) Assignee: SanDisk Technologies Inc., Plano, TX (US)

( * ) Notice: Subject to any disclaimer, the term of this patent is extended or adjusted under 35 U.S.C. 154(b) by 286 days.

(21) Appl. No.: 13/436,313

(22) Filed: Mar. 30, 2012

(65) Prior Publication Data

US 2013/0262745 A1 Oct. 3, 2013

(51) Int. Cl.
*G06F 13/16* (2006.01)
*G06F 3/06* (2006.01)

(52) U.S. Cl.
CPC ............ *G06F 13/1642* (2013.01); *G06F 3/061* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 5,570,315 | A | 10/1996 | Tanaka et al. |
| 5,774,397 | A | 6/1998 | Endoh et al. |
| 6,046,935 | A | 4/2000 | Takeuchi et al. |
| 6,456,528 | B1 | 9/2002 | Chen |
| 6,522,580 | B2 | 2/2003 | Chen et al. |
| 7,173,863 | B2 | 2/2007 | Conley et al. |
| 7,606,084 | B2 | 10/2009 | Kamei |
| 7,733,703 | B2 | 6/2010 | Li |
| 8,037,234 | B2 | 10/2011 | Yu et al. |
| 2007/0130391 | A1* | 6/2007 | Aihara ........................... 710/52 |
| 2008/0320214 | A1* | 12/2008 | Ma et al. ...................... 711/103 |
| 2010/0262760 | A1 | 10/2010 | Swing et al. |
| 2010/0262979 | A1 | 10/2010 | Borchers et al. |
| 2011/0047356 | A2 | 2/2011 | Flynn et al. |
| 2011/0055456 | A1 | 3/2011 | Yeh |
| 2011/0055457 | A1 | 3/2011 | Yeh |
| 2011/0072201 | A1 | 3/2011 | Lee et al. |
| 2011/0119432 | A1 | 5/2011 | Yoon |
| 2012/0079172 | A1* | 3/2012 | Yoshida ....................... 711/103 |
| 2012/0092930 | A1* | 4/2012 | Yamamura et al. ...... 365/185.11 |

OTHER PUBLICATIONS

Hu et al., "Performance Impact and Interplay of SSD Parallelism through Advanced Commands, Allocation Strategy and Data Granularity," May 2011, pp. 96-107.*

* cited by examiner

*Primary Examiner* — Denise Tran
(74) *Attorney, Agent, or Firm* — Davis Wright Tremaine LLP (57) ABSTRACT

A non-volatile memory system includes a memory controller that receives commands from a host and identifies commands that can be executed in parallel. The order in which commands are received is recorded so that responses may be provided to the host in the same order in which the commands were received.

9 Claims, 6 Drawing Sheets

MEMORY SYSTEM WITH COMMAND QUEUE REORDERING

BACKGROUND

This application relates to the operation of re-programmable nonvolatile memory systems such as semiconductor flash memory systems, and, more specifically, to methods of accessing such systems when multiple commands are received from a host.

Solid-state memory capable of nonvolatile storage of charge, particularly in the foil of EEPROM and flash EEPROM packaged as a small form factor card, has recently become the storage of choice in a variety of mobile and handheld devices, notably information appliances and consumer electronics products. Unlike RAM (random access memory) that is also solid-state memory, flash memory is non-volatile, and retains its stored data even after power is turned off. Also, unlike ROM (read only memory), flash memory is rewritable similar to a disk storage device. In spite of the higher cost, flash memory is increasingly being used in mass storage applications. Conventional mass storage, based on rotating magnetic medium such as hard drives and floppy disks, is unsuitable for the mobile and handheld environment. This is because disk drives tend to be bulky, are prone to mechanical failure and have high latency and high power requirements. These undesirable attributes make disk-based storage impractical in most mobile and portable applications. On the other hand, flash memory, both embedded and in the form of a removable card is ideally suited in the mobile and handheld environment because of its small size, low power consumption, high speed and high reliability features.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. In particular, flash memory such as Flash EEPROM allows entire blocks of memory cells to be erased at the same time.

In addition to flash memory, other forms of nonvolatile memory may be used in nonvolatile memory systems. For example Ferroelectric RAM (FeRAM, or FRAM) uses a ferroelectric layer to record data bits by applying an electric field that orients the atoms in a particular area with an orientation that indicates whether a "1" or a "0" is stored. Magnetoresistive RAM (MRAM) uses magnetic storage elements to store data bits. Phase-Change memory (PCME, or PRAM) such as Ovonic Unified Memory (OUM) uses phase changes in certain materials to record data bits. Various other nonvolatile memories are also in use or proposed for use in nonvolatile memory systems.

Nonvolatile memory systems, such as flash memory systems are commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A memory controller is typically provided within the memory system to translate logical addresses received from the host into physical addresses within the memory array, where the data are actually stored, and then keeps track of these address translations. The memory controller may perform a variety of other functions also.

A memory controller is typically formed as an ASIC that is designed to perform the particular functions needed in a particular memory system. These functions may include address translation as described above, ECC, management of multiple memory chips, and communication with a host. Other functions may also be performed in an ASIC that is interposed between the nonvolatile memory and the host interface. In some cases, multiple chips rather than a single ASIC may be used to form a memory controller between the nonvolatile memory and the host interface. The functions performed by the ASIC may be performed by circuits in the ASIC that are dedicated to particular functions, or may be performed by general purpose circuits under the control of firmware that is specific to particular functions.

Typically, communication between a memory system and a host follows a predefined protocol with the host sending commands to the memory controller, and the memory controller causing the commands to be executed in the memory system. Examples of such commands are read and write commands. In some protocols, a host command must be executed and a response sent to the host before a subsequent command is sent. For example, where a host sends a command to read a particular portion of data, that data must be returned to the host before the host sends the next command. Similarly, where the host sends a write command, the data must be written, and some indication sent to the host to tell the host that it is written, before the host sends the next command. Such sequential execution may not utilize memory system resources efficiently and may result in unnecessary latency.

SUMMARY

According to a general aspect of the invention a memory controller in a nonvolatile memory system receives multiple commands from a host without returning responses to the host between commands. The commands are put in a queue, and the order in which the commands were received from the host is recorded. Then the commands are examined to see if any commands can be executed in parallel, or if execution can otherwise be made faster, by reordering the execution of the commands. For example, where two commands access different planes in a die, or access different dies, it may be possible to execute them in parallel. The commands are reordered so that the two commands are sent to the nonvolatile memory in sequence and are executed in parallel, even where they were not received sequentially from the host. Then, the recorded order of the commands is consulted to determine in which order responses should be sent to the host. Responses are then returned to the host in the order in which the commands were received.

According to an example, a method of operating a nonvolatile memory system that is in communication with a host includes: receiving, in the memory system, a plurality of host commands from the host in a first order; recording the first order; subsequently identifying a second order for execution of the plurality of host commands, the second order being different from the first order; subsequently executing the plurality of host commands in the second order; and subsequently providing a plurality of responses to the host, corresponding to the plurality of host commands, the plurality of responses provided to the host in an order corresponding to the recorded first order.

Each of the plurality of host commands may be a read command and the second order for execution may provide faster reading than the first order. Each of the plurality of responses may be a return of data that was requested in a corresponding read command. The method may also include caching data that is read in response to a first command of the plurality of host commands while reading data in response to a second command of the plurality of host commands that was received before the first command. Each of the plurality of host commands may be a write command and the second order for execution may provide faster writing than the first order. Each of the plurality of responses may be a return of an indicator that data specified in a corresponding write command was written. The second order for execution of the plurality of host commands may interleave host commands between a first memory die and a second memory die. The first memory die and the second memory die may be NAND flash memory dies. The second order for execution of the plurality of host commands may interleave execution of host commands between a first plane and a second plane in a nonvolatile memory array, and the nonvolatile memory array may be a NAND flash memory array.

According to an example, a nonvolatile memory system may include: a host interface for communication with a host; a flash memory; and a memory controller integrated between the host interface and the flash memory comprising: a command recording module that records the order of commands received from the host; a command reordering module that modifies the order of the commands received from the host prior to accessing the flash memory according to the commands; and a response ordering module that sends responses to the host, each response corresponding to one of the commands, the responses sent to the host in the order of the commands received from the host as recorded in the command recording module.

The flash memory may include a first memory plane and a second memory plane, and the command reordering module may modify the order of the commands so that the commands are interleaved between the first memory plane and the second memory plane. The flash memory may include a first memory die and a second memory die, and the command reordering module may modify the order of the commands so that the commands are interleaved between the first memory die and the second memory die. The nonvolatile memory system may include a cache memory between the flash memory and the memory controller. The flash memory may consist of NAND flash memory.

According to an example, a method of reading data from a flash memory in a flash memory system includes: receiving a plurality of read commands from a host in a first order, the plurality of read commands including at least a first read command and a second read command, the first read command being received from the host prior to the second read command being received from the host prior to the third command received from the host up to n commands; recording the first order including the first read command being prior to the second read command prior to the third read command up to n commands; reordering the plurality of read commands into a second order so that the second read command is prior to the first read command; sending the plurality of read commands to the flash memory in the second order; receiving data read from the flash memory according to the second order; reordering the data read from the flash memory according to the first order; and sending the data read from the flash memory, reordered according to the first order, to an output of the flash memory system. According to the second order, the plurality of read commands may be interleaved between two or more memory dies. According to the second order, the plurality of read commands may be interleaved between two or more planes of a flash memory array. The data read from the flash memory may be cached prior to sending the data from the flash memory to the output of the flash memory system.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

Memory System

Figure 1:
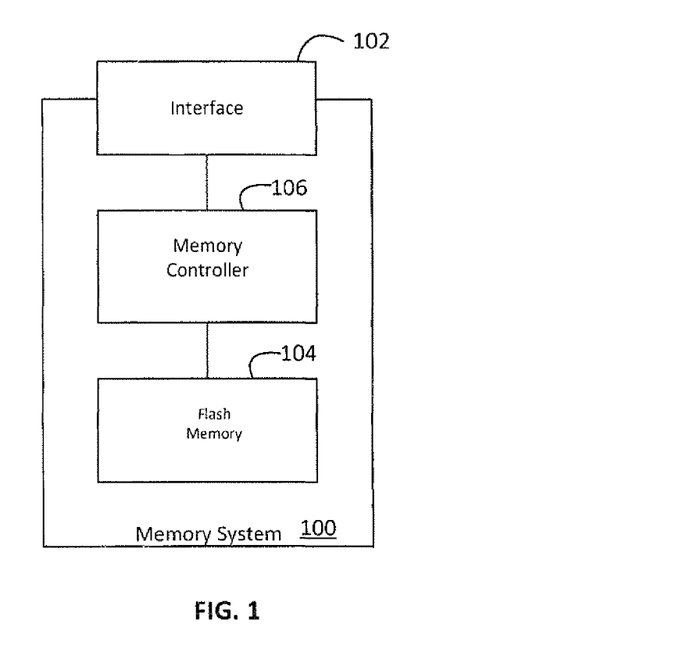
FIG. 1 illustrates schematically the main hardware components of a memory system suitable for implementing the present invention.

FIG. 1 illustrates schematically the main hardware components of a nonvolatile memory system 100 suitable for implementing the present invention. The nonvolatile memory system is typically in the form of a memory card or an embedded memory system. The nonvolatile memory system 100 typically operates with a host through a host interface 102. The host interface may comply with a particular standard so that the memory system is compatible with a range of host systems. Commands are sent to the memory system 100 over the host interface 102 according to a protocol. Different protocols may be suitable for different applications. For example, embedded memory systems may use different protocols to those used in removable memory systems.

The nonvolatile memory system 100 includes a nonvolatile memory, in this case a flash memory 104, whose operations are controlled by a memory controller 106. The nonvolatile memory includes an array of non-volatile memory cells that is distributed over one or more integrated circuit chips. For example, the nonvolatile memory may be made up of NAND flash memory chips, with each NAND flash memory chip having multiple planes. Examples of NAND flash memory architectures are provided in U.S. Pat. Nos. 7,606,084; 5,570,315; 5,774,397; 6,046,935; 6,456,528; and 6,522,580.

The memory controller 106 typically includes an interface, a processor, an optional coprocessor, ROM (read-only-memory), RAM (random access memory) and optionally some programmable nonvolatile memory. Firmware stored in nonvolatile ROM and/or the optional nonvolatile memory provides codes for the processor to implement the functions of the controller. The memory controller may be formed as a single chip, an ASIC, or may be formed by multiple chips that perform different functions. When the memory controller chip is formed as an ASIC, there may be dedicated circuits for performing particular functions so that the processor is not overloaded with functions that can be more efficiently performed by dedicated circuits.

One function of the memory controller is to receive commands from the host through the host interface, and to cause those commands to be executed. In the case of a read command this means determining which data is the subject of the host read command, determining where the data is stored in the nonvolatile memory, and sending appropriate instructions to the nonvolatile memory so that the data is read from the memory cells and is returned to the memory controller. Typically, such an operation involves converting a command received from the host according to a particular protocol into a different format which is used to access the corresponding data in the memory array. For example, a host may specify a logical address, which the memory controller converts to a physical address using a lookup table. Then the memory controller accesses the physical address using appropriate instructions to the nonvolatile memory. Thus the memory controller translates commands from the host into a format in which they are sent to the nonvolatile memory.

Figure 2:
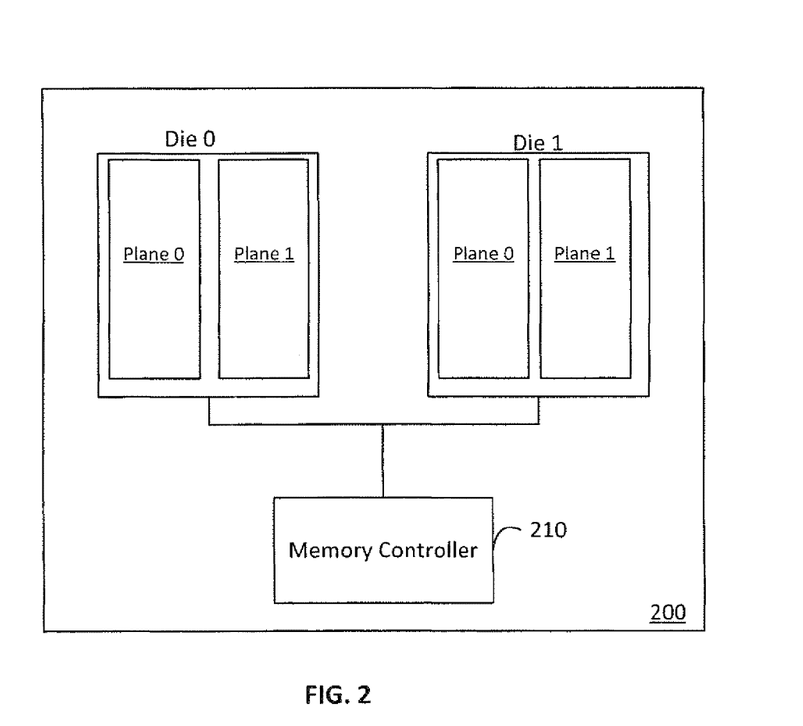
FIG. 2 illustrates a multi-plane, multi-die flash memory system.

FIG. 2 shows a more detailed view of portion of a flash memory system 200 that has a nonvolatile memory that is made up of two memory dies, die 0, die 1, each containing two planes. Each plane has its own bit-line and word-line circuits and is capable of operating substantially independently of other planes (e.g. data can be written, or read, one plane at a time). Data may be written in a minimum unit of a page, which in some NAND memory designs corresponds to a wordline in a plane. The memory controller 210 is responsible for receiving commands from the host and directing them to the appropriate location in the nonvolatile memory. Thus, the memory controller must convert a command from the host into instructions that are directed to a particular die, plane, and location within a plane (e.g. to a particular page).

Some hosts may specify a physical address in the nonvolatile memory. However, the physical address may still have to be converted into a different format, or may be mapped to a different physical address if the data is not at the physical address at which the host expects to find it. In one example, a protocol allows a host to specify a small unit of data, for example a single page of data in a plane of a NAND flash memory. The host may not wait for a response after each individual page command but may send several such commands for execution, either individually, or in batches.

Figure 3:
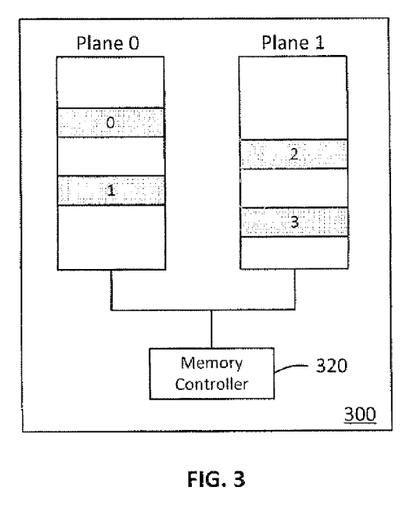
FIG. 3 illustrates multiple host commands accessing a flash memory array that includes two dies.

FIG. 3 shows an example of two planes, plane 0 and plane 1, in a nonvolatile memory 300. Four portions of data, numbered 0, 1, 2, 3, are stored in the nonvolatile memory at the locations indicated. Plane 0 and plane 1 are separately addressed by the memory controller 320. Each of the portions of data occupies a single page within one of the planes. A host may issue instructions to the memory system to access pages in any order. In the present example, the host issues a series of four read commands to the memory system, to read the four portions of data in FIG. 3. The host sends the read commands in ascending order, i.e. the host sends a read command for data 0, then a read command for data 1, then a read command for data 2, and then a read command for data 3.

Figure 4A:
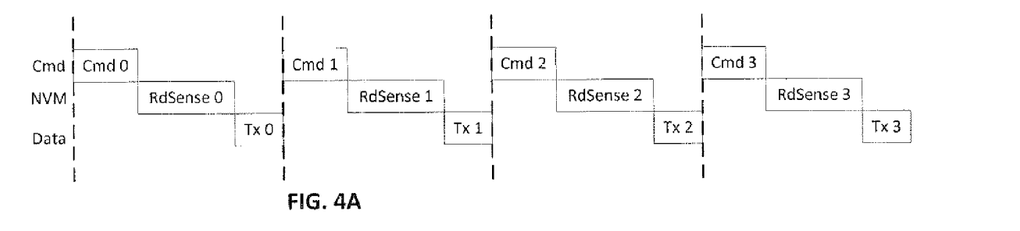
FIG. 4A illustrates a first order for executing commands.

FIG. 4A shows a timing diagram for a first way that a memory controller may deal with the four commands, read 0, read 1, read 2, read 3. The four commands may be received together, or separately, from the host. In this example, the command to read data 0, "Cmd 0", is first sent from the memory controller to the nonvolatile memory over a command bus ("Cmd"). Then, when the command is received by the nonvolatile memory ("NVM") the memory executes the command by performing a read-sense operation for data 0, "RdSense 0". The data that is read out of the memory cells in the portion of the nonvolatile memory occupied by data 0 is then transferred from the nonvolatile memory to the memory controller, "Tx 0", over a data bus "Data". Then the command to read data 1, "Cmd 1", is sent from the memory controller to the nonvolatile memory and the process is repeated for data 1. After data 1 is transferred back to the memory controller, the process is repeated for data 2. Then, the process is repeated for data 3. This sequential operation is well adapted to systems in which host commands are received one-at-a-time, with the host awaiting a response before sending the next command. However, more efficient methods may be used where the host sends multiple commands that are directed to relatively small portions of the nonvolatile memory (e.g. to individual pages).

Figure 4B:
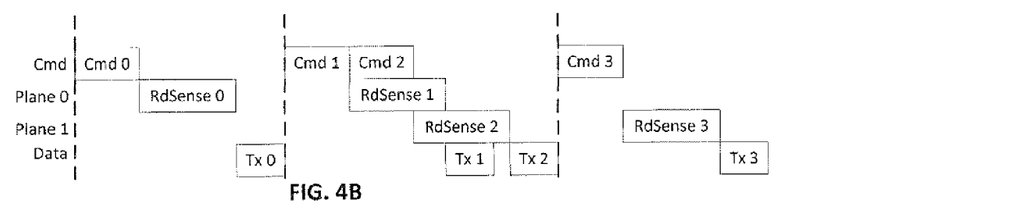
FIG. 4B illustrates executing the commands of FIG. 4A according to the first order with some parallel execution.

FIG. 4B shows a timing diagram for a second way that a memory controller may deal with the four commands, read 0, read 1, read 2, read 3. This example is similar to the example of FIG. 4A but instead of waiting for execution of Cmd 1 and transfer of data 1, Tx 1, before sending Cmd 2, in this case Cmd 2 is sent immediately after Cmd 1 or combined with Cmd 1. This means that two commands Cmd 1 and Cmd 2 are sent in succession (as shown), or that a single multiplane sense command is sent for both Cmd1 and Cmd2 (multiplane commands are described in more detail with respect to FIG. 8). A read-sense operation may then begin in plane 1 ("RdSense") in parallel with the read-sense operation in plane 0. This parallel operation may provide significant time saving. It will be understood that the present figures are not intended to be to scale and that the time for read-sense operations may be much longer than for transferring a command, or for transferring data. Thus, the saving in performing such time-consuming operations may be more significant than FIG. 4B would indicate.

Figure 4C:
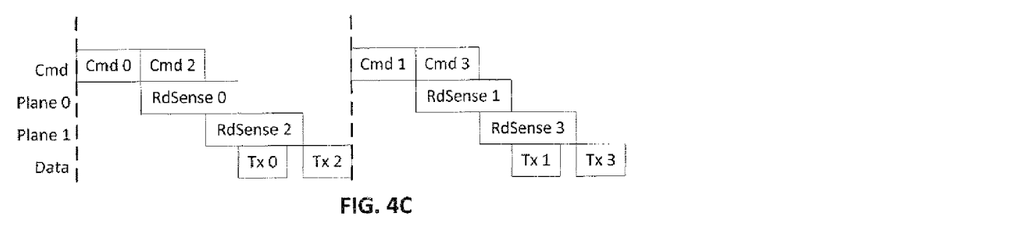
FIG. 4C illustrates executing commands of FIG. 4A according to a second order, after reordering, with additional parallel execution.

FIG. 4C shows a timing diagram for a third way that a memory controller may deal with the four commands, read 0, read 1, read 2, read 3. In this example, the commands are sent to the nonvolatile memory in a different order to the order in which they were received from the host. Specifically, instead of sending them in the order 0, 1, 2, 3, sent by the host, the commands are sent in the order 0, 2, 1, 3, as a result of a reordering of the commands by the memory controller. In this case, the memory controller identifies that Cmd 0 and Cmd 2 are directed to planes 0 and 1 respectively, and thus can be executed in parallel. By reordering the commands so that Cmd 2 is sent immediately after Cmd 0 (or by combining commands), the two commands are executed substantially in parallel, i.e. RdSense 0 and RdSense 1 are performed substantially in parallel. Once RdSense 0 is finished, data 0 is transferred from the nonvolatile memory to the memory controller, Tx 0. Then when RdSense 2 is finished, data 2 is transferred from the nonvolatile memory to the memory controller. Subsequently, Cmd 1 and Cmd 3 are sent to the nonvolatile memory and are executed substantially in parallel in a similar fashion to Cmd 0 and Cmd 2. Such alternating of commands between planes may be considered as a form of interleaving. It can be seen that reordering of commands allows execution of commands to be performed more rapidly because of parallel execution in different planes. Similarly, where there are multiple dies, or other units within the nonvolatile memory that may be separately addressed, and that can operate in parallel, commands may be interleaved between dies, or other units, so that they are executed in parallel.

In many cases it is necessary to return responses to the host in an order that corresponds to the order in which commands were received. So, for example, in the case above, responses would have to be sent in ascending order, 0, 1, 2, 3. In the example of FIG. 4C, this means that the data has to be reordered from the order in which it was read. For example, data 2 may be buffered in the memory controller, or elsewhere, so that data 1 is read and sent to the host before data 2. In order to achieve this reordering, the order in which commands are received from the host may be recorded and referred to before any response is sent to the host.

Figure 5:
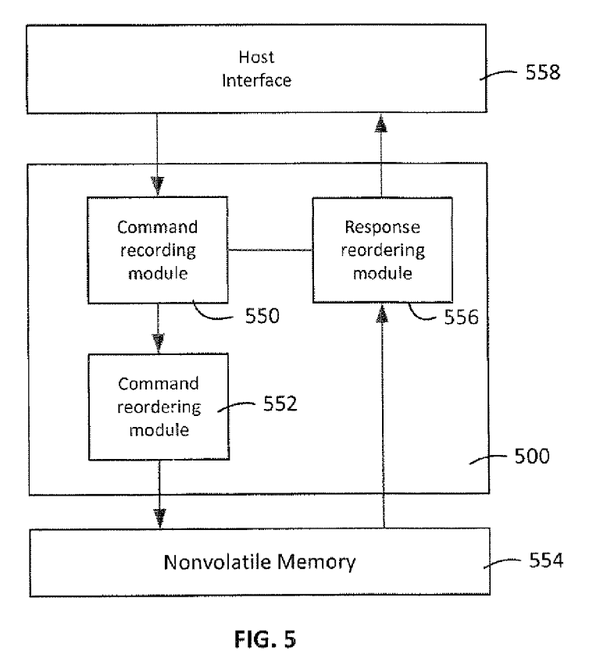
FIG. 5 illustrates components of a memory controller.

FIG. 5 shows components of a memory controller 500 according to an example. The memory controller 500 includes a command recording module 550 that records the order in which commands are received and maintains the record at least until the command has been executed and a response returned to the host. A command reordering module 552 reorders commands to take advantage of parallel access to the nonvolatile memory where possible by interleaving commands between planes or dies. The command reordering module 552 may examine the queue of commands to be executed at any time to try to identify which commands are amenable to parallel execution, or interleaving. For example, before a particular command is sent to the nonvolatile memory 554, the command reordering module 552 may look through the queue to see if there is another command in the queue that could be performed in parallel with the particular command. If there is such a command, then it may be moved up in the queue so that it is executed in parallel with the particular command in question. A response reordering module 556 is also provided. The response reordering module is in communication with the command recording module 550 so that it can send responses to the host, via host interface 558, in the order in which commands were received, as indicated by the command recording module 550.

Figure 6:
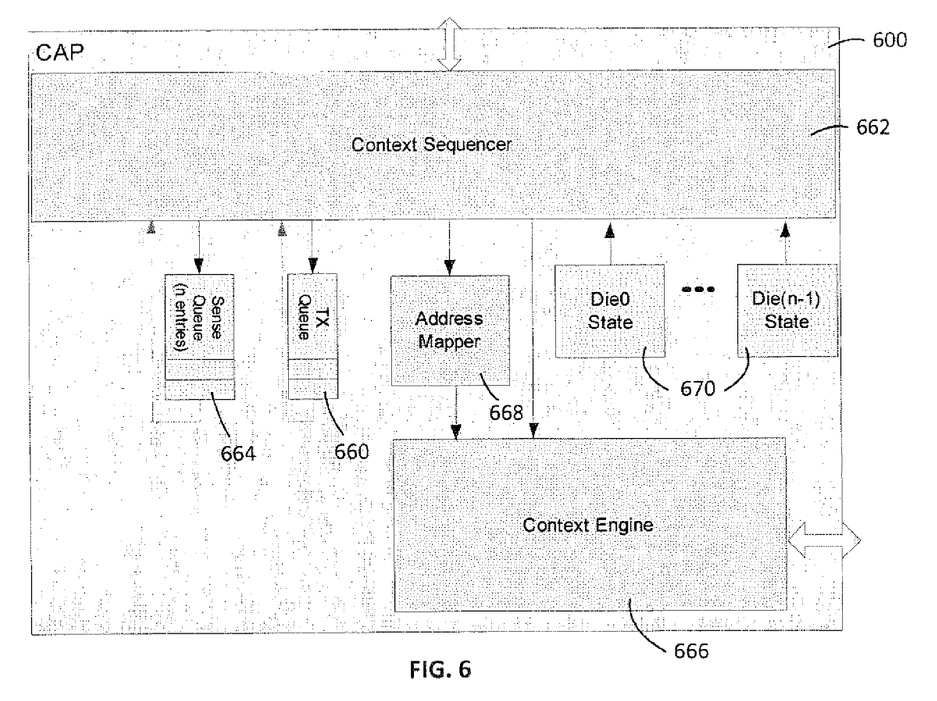
FIG. 6 illustrates details of a certain memory controller components.

FIG. 6 shows a detailed example of a portion of a memory controller that may implement aspects of the present invention. In particular, FIG. 6 shows a Command Automation Processing (CAP) block 600 in an ASIC, which extracts plane and die addresses from read or write commands that are received from the host. The CAP block 600 records commands in the order in which the host sends them in the transfer queue ("TX Queue") 660. A Context Sequencer 662 then queues the commands for execution. For read commands, the Sense Queue 664 is used to store the reordered commands, which are then transferred to the Context engine 666, and to the nonvolatile memory. An Address Mapper 668 is provided for converting host addresses to physical addresses in the nonvolatile memory. A series of die state inputs 670 are provided so that the state of each die is known and a die that is inactive can be identified by the CAP and another command can be sent to that die (out of order, where necessary). The components shown in FIG. 6 may be formed by dedicated circuits in an ASIC so that reordering of commands is performed rapidly, and without using processor capacity.

Figure 7:
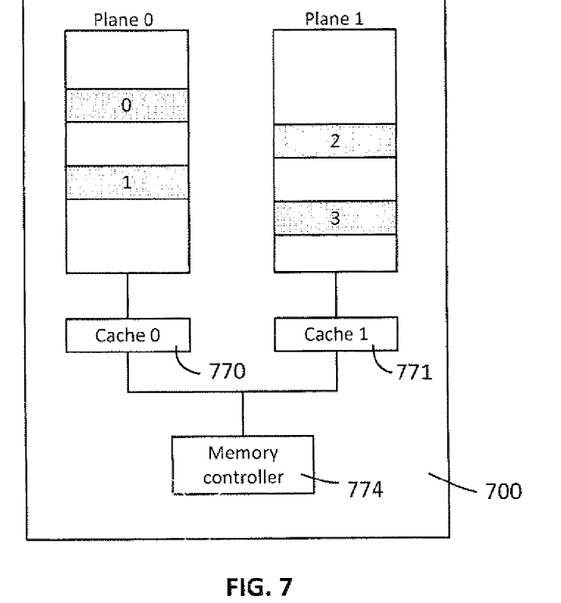
FIG. 7 shows a memory system having on-chip cache.

FIG. 7 shows an example of a memory system 700 having cache memory between the memory controller and the nonvolatile memory. In this example, each plane has a cache memory 770, 771 that holds one page so that, for example, when a page is read from a plane, the data from that page may be held (or "cached") in the cache memory connected to that plane. This may allow a subsequent read-sense operation to commence in a plane before the data from the previous read-sense operation has been sent to the controller 774. Thus, a subsequent read-sense operation is performed in parallel with transfer of data from the previous read-sense operation from the cache memory to the memory controller. A cache memory may be a simple one-page memory such as a row of latches that are on the same die as the flash memory, such as a cache buffer that is commonly located on a NAND flash memory chip.

Figure 8A:
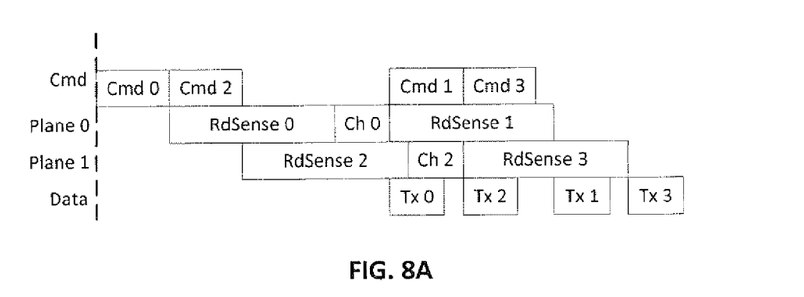
FIG. 8 illustrates the execution of commands, reordered from the order in which they were received from the host, in the memory of FIG. 7.
Figure 8B:
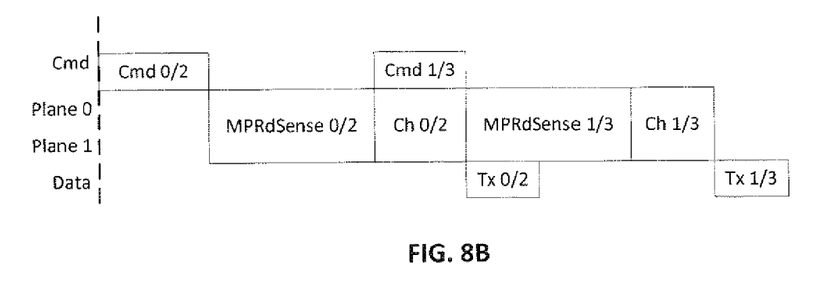

FIG. 8A shows a timing diagram for operation of the nonvolatile memory system of FIG. 7. In contrast to the timing diagram of FIG. 4, FIG. 8A shows that after RdSense 0 is completed, the data from RdSense 0 is cached, "Ch 0". Immediately after the completion of Ch 0, the next read-sense operation in plane 0, RdSense 1, begins. As RdSense 1 is being performed, the data from RdSense 0 is transferred from the nonvolatile memory to the memory controller, Tx 0. Similarly, as soon as RdSense 2 is completed in plane 1, the data that was read is cached, Ch 2 and a subsequent read-sense operation, RdSense 3, begins. Transfer of the data from cache to the memory controller is performed in parallel with RdSense 3. FIG. 8B shows a timing diagram for an alternative operation of the nonvolatile memory system of FIG. 7 in which commands are combined for parallel execution, For example, instead of sending separate commands Cmd 0 and Cmd 2 in succession, they are combined into a MultiPlane (MP) command to perform a MultiPlane ReadSense operation (MPRdSense). FIG. 8A shows that after MPRdSense 0/2 is completed, the data from MPRdSense 0/2 is cached, Ch 0/2, and the next multiplane 1/3 read-sense begins. As MPRdSense 1/3 is being performed, the data from MPRdSense 0/2 is transferred from the nonvolatile memory to the memory controller, Tx 0/2. Thus, a cache memory can allow a read-sense operation to occur in parallel with transfer of data from a previous read-sense operation instead of waiting for the completion of transfer of data from the previous read-sense operation. In general, a suitable cache is directly connected to a plane so that data can be rapidly transferred from read-sensing circuits in the plane to the cache. Thus, the time needed for caching may be very small.

Figure 9:
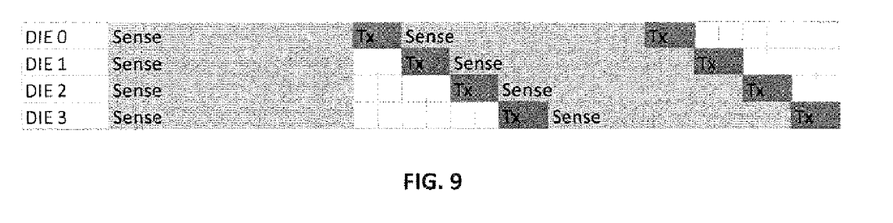
FIG. 9 shows parallel read-sense operations according to an example.

FIG. 9 is a timing diagram showing parallel read-sense operations in four different dies in parallel. Dies 0-3 are initially sensed in parallel, and then the data is transferred out from dies 0-3 in series. When an individual die has transferred its data it starts sensing the next page of data so that, for example, die 0 begins sensing a second page while die 1 is still transferring its first page.

Figure 10:
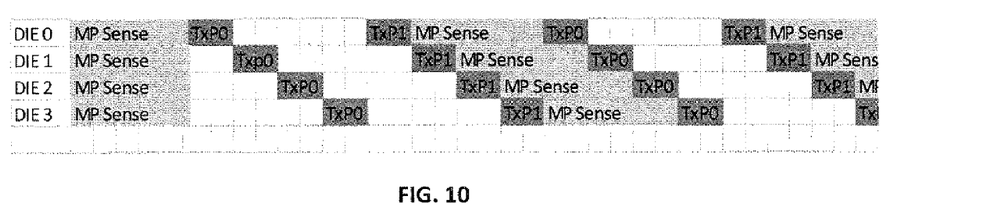
FIG. 10 shows parallel read-sense operations according to another example.
Figure 11:
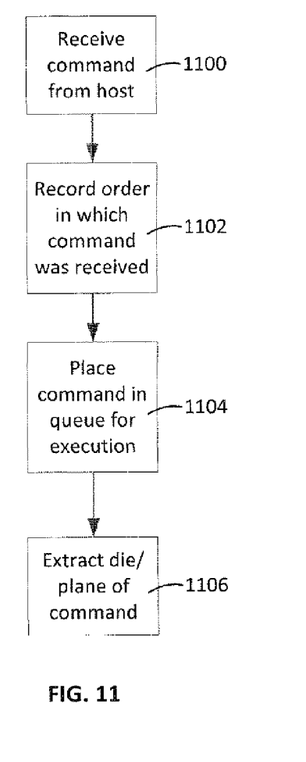
FIG. 11 is a flowchart for a process of receiving commands in a nonvolatile memory.

FIG. 10 is a timing diagram showing Multiplane read-sense operations in four die in parallel. As in FIG. 9, dies 0-4 are initially sensed in parallel, and then data is transferred out in series. However, here there are two pages of data to be transferred out of each die, one page from each plane, so there are two data transfer operations. For example, after the MultiPlane Sense (MP Sense) of die 0, data from plane 0 is transferred (TxP0) and data from plane 1 is transferred (TxP1). Similarly, there are two transfer operations for dies 1-3. In multiplane designs with more than two planes per die, there are more than two such data transfer operations FIG. 11 is a flowchart that shows how commands are handled when they are received from a host by a memory controller. After the command is received 1100, the order in which it was received is recorded 1102. This may be done by saving a copy of the command in an ordered queue, or by recording some identifier associated with the command in an ordered queue, or by some other technique. The command is then placed in a queue for execution 1104. Thus, commands may be added to the queue in the order in which they were received, with reordering taking place later. Alternatively, reordering may occur as commands are added to the queue for execution. The die, and/or plane of the data to which the command is directed are extracted from the command 1106 so that it can be easily checked against die and/or planes of other commands.

Figure 12:
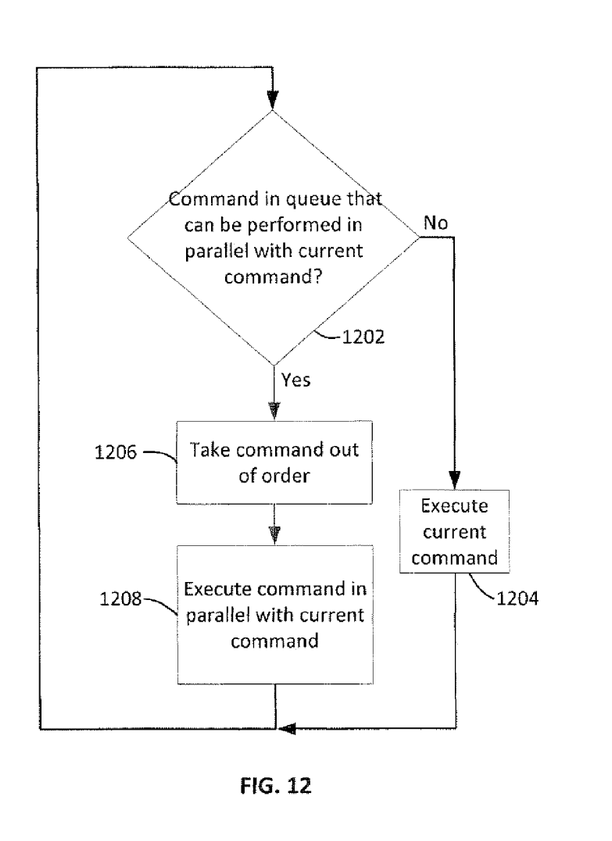
FIG. 12 is a flowchart for a process of reordering commands in a nonvolatile memory.

FIG. 12 is a flowchart that shows how execution of commands is handled by the memory controller. When a command becomes the current command, the memory controller checks to see if there are any commands in the queue that can be performed in parallel with the current command 1202. For example, where the die and/or plane of the commands has been extracted, the memory controller may compare the extracted information of the current command with that of other commands in the queue to see if there is a command in the queue that can be performed in parallel. For example, if the current command is a read command directed to one die or plane, a read command directed to a different die or plane may be performed in parallel. If there are no commands in the queue that can be performed in parallel with the current command then the current command is executed 1204 and the process moves on to the next command. If there is another command that can be performed in parallel then that command is taken out of order 1206 for execution in parallel with the current command 1208. For example, two read commands on different dies may be performed in parallel where the two commands are sent to the nonvolatile memory so that the data is sensed in parallel. In some cases, it may be possible to execute more than two commands in parallel. For example, in a four plane memory array, four different page-level read commands may be received that are directed to the four planes. These four commands could then be executed in parallel by sending them to the memory array in sequence, even if they are not received sequentially (i.e. if there are other commands received between them, those other commands may be deferred to allow the four commands to be executed first). Thus, interleaving of commands may occur across all, or some, of the planes, or dies, of the memory array.

In determining whether a command in the queue can be performed in parallel with the current command, the memory controller may check the current status of the die and/or plane associated with the command to see if it is busy. If the current state of the die is idle, then the command can be executed immediately. However, if the current state is busy, then the command cannot be executed immediately and it may not be possible to perform parallel execution with the current command.

Figure 13:
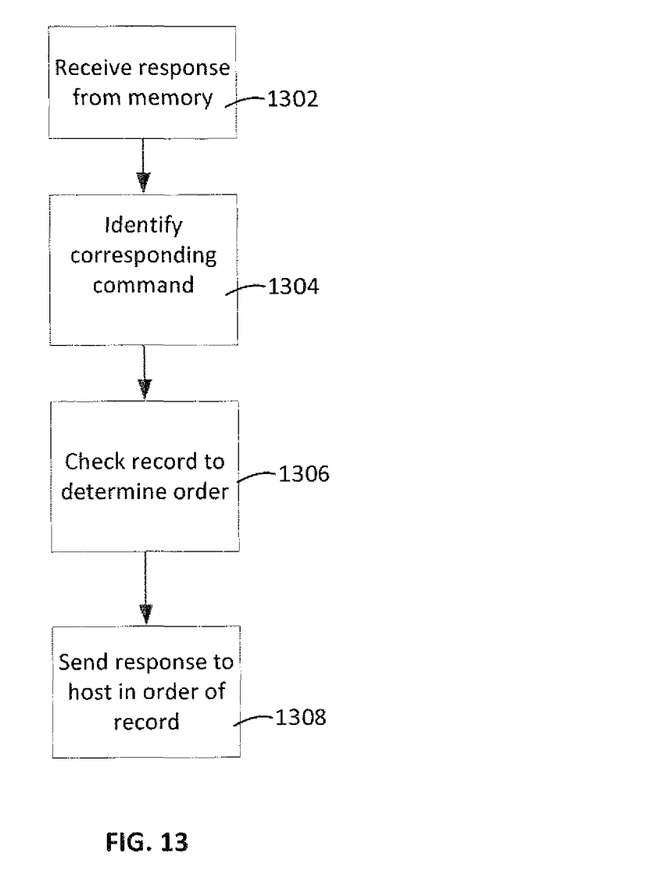
FIG. 13 is a flowchart for a process of sending responses to a host.

FIG. 13 shows how responses to the host may be managed by the memory controller. After a command is send by the memory controller, the memory controller may receive a response from the nonvolatile memory 1302. In the case of a read command, the response may be the data that was read. In the case of a write command, the response may be an indication that data was successfully written. The memory controller then identifies the corresponding command 1304 and checks a record to determine the order in which commands were received 1306. The response is then sent to the host in the order indicated by the record 1308, i.e. in the order in which the corresponding commands were received. This may require some reordering from the order in which responses were received from the memory.

CONCLUSION

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a nonvolatile memory system that is in communication with a host comprising:
   receiving, in the memory system, a plurality of host read commands from the host in a first order in which a first read command directed to a first plane in a NAND flash memory die is prior to a second read command directed to a second plane in the NAND flash memory die;
   recording the first order;
   subsequently identifying a second order for execution of the plurality of host read commands, the second order being different from the first order, the second read command being prior to the first read command in the second order;
   subsequently executing the plurality of host read commands in the second order that interleaves host read commands between the first plane and the second plane in the first NAND flash memory die, the first plane having a first cache memory and the second plane having a second cache memory;
   transferring data from the first cache memory to a memory controller in parallel with reading additional data from the first plane;
   transferring data from the second cache memory to the memory controller in parallel with reading additional data from the second plane; and
   subsequently transferring data to the host, in an order corresponding to the recorded first order.

2. The method of claim 1 wherein the second order for execution provides faster reading than the first order.

3. The method of claim 1 wherein the second order for execution of the plurality of host read commands interleaves host read commands between the first NAND flash memory die and a second NAND flash memory die.

4. A nonvolatile memory system comprising:
   a host interface for communication with a host;
   a first flash memory die containing a first memory plane having a first cache memory and a second memory plane having a second cache memory; and
   a memory controller integrated between the host interface and the first flash memory die comprising:

a) a command recording module that records the order of read commands received from the host;

b) a command reordering module that modifies the order of the read commands received from the host prior to accessing the flash memory according to the read commands so that the commands are interleaved between the first memory plane and the second memory plane of the first flash memory die, the order of read commands received from the host having a first read command directed to the first memory plane prior to a second read command directed to the second memory plane, the reordering module placing the second read command prior to the first read command;

c) a response ordering module that sends responses to the host, each response corresponding to one of the commands, the responses sent to the host in the order of the commands received from the host as recorded in the command recording module; and d) a bus connecting the first cache memory and the second cache memory to the memory controller, the bus transferring data from the first cache memory while additional data is read from the first memory plane and transferring data from the second cache memory while additional data is read from the second memory plane.

5. The nonvolatile memory system of claim 4 further comprising a second memory die, and wherein the command reordering module modifies the order of the read commands so that the read commands are interleaved between the first memory die and the second memory die.

6. The nonvolatile memory system of claim 4 wherein the first flash memory die consists of NAND flash memory.

7. A method of reading data from a flash memory in a flash memory system comprising:

receiving a plurality of read commands from a host in a first order, the plurality of read commands including at least a first read command directed to a first plane of a first memory die, the first plane having a first memory cache and a second read command directed to a second plane of the first memory die, the second plane having a second memory cache, the first read command being received from the host prior to the second read command being received from the host;

recording the first order including the first read command being prior to the second read command;

reordering the plurality of read commands into a second order so that the second read command is prior to the first read command;

sending the plurality of read commands to the flash memory in the second order;

receiving data read from the flash memory according to the second order, data of the first read command received from the first memory cache while additional data is read from the first plane, and data of the second read command received from the second memory cache while additional data is read from the second plane;

reordering the data read from the flash memory according to the first order; and sending the data read from the flash memory, reordered according to the first order, to an output of the flash memory system.

8. The method of claim 7 wherein, according to the second order, the plurality of read commands are interleaved between two or more memory dies including the first memory die and one or more additional memory dies.

9. The method of claim 8 wherein the two or more memory dies consists of the first memory die, a second memory die, a third memory die, and a fourth memory die, each having two planes.

* * * * *